(12) United States Patent
Wang et al.

(10) Patent No.: US 6,291,036 B1
(45) Date of Patent: Sep. 18, 2001

(54) VACUUM IG WINDOW UNIT WITH SPACERS IN SEAL

(75) Inventors: Yei-Ping (Mimi) H. Wang, Troy; Scott V. Thomsen, Milford, both of MI (US)

(73) Assignee: Guardian Industries Corporation, Auburn Hills, MI (US)

( * ) Notice: Subject to any disclaimer, the term of this patent is extended or adjusted under 35 U.S.C. 154(b) by 0 days.

(21) Appl. No.: 09/422,244

(22) Filed: Oct. 21, 1999

Related U.S. Application Data

(63) Continuation of application No. 09/303,550, filed on May 3, 1999, and a continuation of application No. 09/404,659, filed on Sep. 24, 1999.

(51) Int. Cl.[7] .............................. E06B 3/24; C03C 27/00
(52) U.S. Cl. .......................... 428/34; 156/107; 156/109; 52/786.13
(58) Field of Search ............................ 428/34, 120, 119; 52/786.1, 786.13; 156/107, 109

(56) References Cited

U.S. PATENT DOCUMENTS

| | | |
|---|---|---|
| 49,167 | 1/1865 | Stetson . |
| 1,370,974 | 3/1921 | Kirlin . |
| 1,448,351 | 3/1923 | Kirlin . |
| 1,774,860 | 9/1930 | Wendler et al. . |
| 2,011,557 | 8/1935 | Anderegg . |
| 2,303,897 | 12/1942 | Smith . |
| 2,962,409 | 11/1960 | Ludlow et al. . |
| 3,441,924 | 4/1969 | Peek et al. . |
| 3,742,600 | 7/1973 | Lowell . |
| 3,902,883 | 9/1975 | Bayer . |
| 3,912,365 | 10/1975 | Lowell . |
| 3,936,553 | 2/1976 | Rowe . |
| 3,990,201 | 11/1976 | Falbel . |
| 4,064,300 | 12/1977 | Bhangu . |
| 4,130,408 | 12/1978 | Crossland et al. . |
| 4,130,452 | 12/1978 | Indri . |
| 4,305,982 | 12/1981 | Hirsch . |
| 4,422,280 | 12/1983 | Mertin et al. . |
| 4,429,509 | * 2/1984 | Vachet et al. ........................ 52/788 |
| 4,514,450 | 4/1985 | Nowobilski et al. . |
| 4,683,154 | 7/1987 | Benson et al. . |
| 4,786,344 | 11/1988 | Beuther . |

(List continued on next page.)

FOREIGN PATENT DOCUMENTS

| | | |
|---|---|---|
| 0 294 754 | 6/1988 | (EP) . |
| 0831073 | 10/1999 | (EP) . |
| 2 482 161 | 11/1981 | (FR) . |
| 10-331532 | 12/1998 | (JP) . |
| WO 99/48830 | 9/1999 | (WO) . |

OTHER PUBLICATIONS

"Thermal Outgassing of Vacuum Glazing" by Lenzen, et. al., School of Physics, Univ. of Sydney, NSW 2006, Australia.

"Temperature–Induced Stresses In Vacuum Glazing: Modelling and Experimental Validation" by Simko, et. al., Solar Energy, vol. 63, No. 1, pp. 1–21, 1998.

"Current Status of the Science and Technology of Vacuum Glazing" by Collins, et. al., Solar Energy, vol. 62, No. 3, pp. 189–213, 1998.

"Fabrication of Evacuated Glazing at Low Temperature" by Griffiths, et. al., Solar Energy, vol. 63, No. 4, pp. 243–249, 1998.

English Translation of JP 10–331532, "Manufacture of Low–Pressure Double Glazing", HIROMI, Abstract PCT International Search Report, Feb. 2, 2001.

*Primary Examiner*—Donald Loney
(74) *Attorney, Agent, or Firm*—Nixon & Vanderhye P.C.

(57) ABSTRACT

A vacuum insulating glass (IG) unit and method of making the same. A plurality of spacers or pillars are provided in contact with and/or embedded within an edge seal in order to better control the gap or spacing between the two opposing glass substrates.

12 Claims, 2 Drawing Sheets

U.S. PATENT DOCUMENTS

| | | |
|---|---|---|
| 4,822,649 | 4/1989 | Canaud et al. . |
| 4,824,215 | 4/1989 | Joseph et al. . |
| 4,874,461 | 10/1989 | Sato et al. . |
| 4,924,243 | 5/1990 | Sato et al. . |
| 4,928,448 | 5/1990 | Phillip . |
| 4,983,429 | 1/1991 | Takayanagi et al. . |
| 5,106,663 * | 4/1992 | Box ................................. 428/34 |
| 5,120,584 | 6/1992 | Ohlenforst et al. . |
| 5,124,185 | 6/1992 | Kerr et al. . |
| 5,157,893 | 10/1992 | Benson et al. . |
| 5,234,738 | 8/1993 | Wolf . |
| 5,247,764 | 9/1993 | Jeshurun et al. . |
| 5,315,797 | 5/1994 | Glover et al. . |
| 5,399,406 | 3/1995 | Matsuo et al. . |
| 5,489,321 | 2/1996 | Tracy et al. . |
| 5,494,715 | 2/1996 | Glover . |
| 5,499,128 | 3/1996 | Hasegawa et al. . |
| 5,596,981 | 1/1997 | Soucy . |
| 5,657,607 | 8/1997 | Collins et al. . |
| 5,664,395 | 9/1997 | Collins et al. . |
| 5,739,882 | 4/1998 | Shimizu et al. . |
| 5,855,638 | 1/1999 | Demars . |
| 5,891,536 | 4/1999 | Collins et al. . |
| 5,902,652 | 5/1999 | Collins et al. . |
| 5,905,559 | 5/1999 | Fujiwara et al. . |
| 6,049,370 | 4/2000 | Smith, Jr. et al. . |

* cited by examiner

Fig. 1 (PRIOR ART)
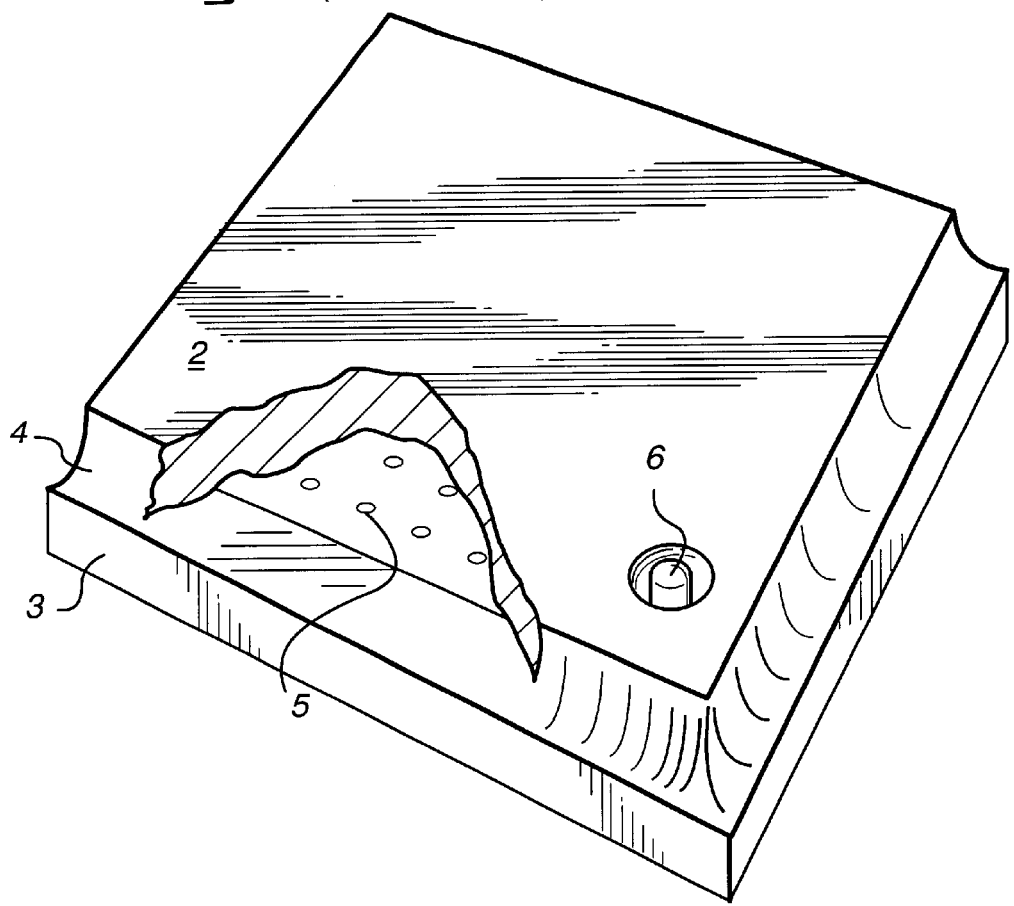
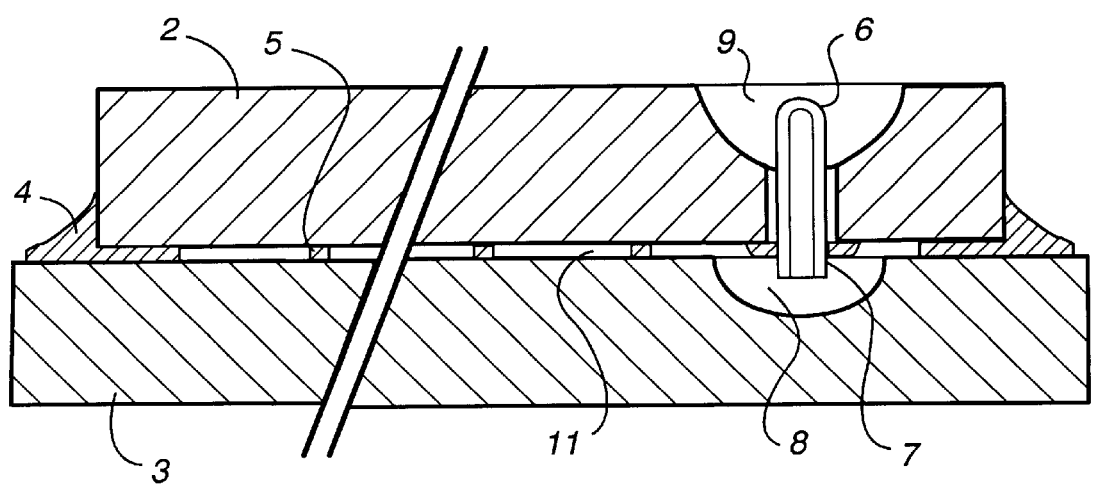
Fig. 2 (PRIOR ART)

US 6,291,036 B1

VACUUM IG WINDOW UNIT WITH SPACERS IN SEAL

RELATED APPLICATIONS

This application is a continuation of U.S. Ser. Nos. 09/303,550 entitled "VACUUM IG PILLAR WITH DLC COATING" filed May 3, 1999, pending continuation and of 09/404,659 filed Sep. 24, 1999 entitled "VACUUM IG WINDOW UNIT WITH PERIPHERAL SEAL AT LEAST PARTIALLY DIFFUSED AT TEMPER", are both hereby incorporated herein by reference.

BACKGROUND OF THE INVENTION

This invention relates to a vacuum insulating glass (IG) unit, and a method of making the same. More particularly, this invention relates to a vacuum IG unit including a peripheral seal including at least one spacer therein.

Vacuum IG units are known in the art. For example, see U.S. Pat. Nos. 5,664,395, 5,657,607, 5,891,536 and 5,902, 652, the disclosures of which are all hereby incorporated herein by reference.

Prior art FIGS. 1–2 illustrate a conventional vacuum IG unit. IG unit 1 includes two spaced apart sheets of glass 2 and 3 which enclose an evacuated or low pressure space 11 therebetween. Glass sheets 2 and 3 are interconnected by peripheral or edge seal of fused solder glass 4 and an array of support pillars 5.

Pump out tube 6 is sealed by solder glass 7 to an aperture or hole which passes from an interior surface of glass sheet 2 to the bottom of recess 9. Cavity 8 in sheet 3 accommodates the stump of tube 6. A vacuum is attached to tube 6 (prior to the tube being sealed) so that the interior cavity 11 between sheets 2 and 3 can be evacuated to create a low pressure area. After evacuation, tube 6 is melted to seal the vacuum.

As illustrated in FIGS. 1–2, spacers or pillars 5 are typically provided between the glass sheets 2 and 3 through the viewing area of the unit, but not at edges thereof where peripheral or edge seal 4 is located. This results in the thickness of gap or space 11 potentially varying from one thickness near the edge(s) of the glass sheet(s) to a different thickness near the center where more spacers are provided. In other words, there is a potential for substantial undesirable gap variation at the edges relative to center areas of the unit. If the gap or thickness of the low pressure space 11 between the substrates is lower or higher at the edge than proximate the center of the unit, then the edge seal and/or glass substrate(s) can have higher stress than if the gap is approximately equal throughout the unit. The higher the stress, the more likely it is for either of the glass substrates to crack or break, and the more likely it is for the edge seal to delaminate.

It is apparent from the above that there exists a need in the art for a vacuum IG unit, and corresponding method of making the same, designed so as to reduce the potential for significant gap variation of the thickness of the space between the two substrates.

This invention will now be described with respect to certain embodiments thereof, accompanied by certain illustrations.

SUMMARY OF THE INVENTION

An object of this invention is to provide a vacuum insulating glass (IG) unit including a peripheral or edge seal including at least one spacer or pillar embedded therein.

Another object of this invention is to mix a plurality of spacers into a seal material and thereafter deposit or otherwise provide the mixture around a periphery or edge of at least one substrate in the formation of a vacuum IG unit.

Another object of this invention is to fulfill any and/or all of the above-listed objects.

Generally speaking, this invention fulfills any or all of the above described objects or needs in the art by providing a thermally insulating glass panel comprising:

first and second spaced apart glass substrates defining a low pressure space therebetween having a pressure less than atmospheric pressure;

a first plurality of spacers disposed between said first and second glass substrates for spacing said substrates from one another in order to maintain said low pressure space therebetween;

a hermetic peripheral seal including at least one sealing material; and a second plurality of spacers for spacing said substrates from one another, at least some of said spacers of said second plurality being in contact with said sealing material.

This invention further fulfills any or all of the above described needs or objects by providing a method of making a vacuum IG unit comprising the steps of:

providing first and second substrates;

providing a plurality of spacers in a sealing material to form a sealing mixture;

applying the sealing mixture to at least a major surface of the first substrate proximate an edge thereof;

providing additional spacers proximate a central area of the first substrate;

moving the second substrate into a position such that at least some of the spacers proximate the central area of the first substrate and the spacers in the sealing mixture are disposed between the first and second substrates;

creating a seal using the sealing mixture so that a seal of the vacuum IG unit includes spacers therein; and evacuating a space between the first and second substrates so that the space has a pressure less than atmospheric pressure.

In certain embodiments, the seal may be a hermetic seal, while in other embodiments it need not be.

IN THE DRAWINGS

FIG. 1 is a prior art partial cutaway perspective view of a conventional vacuum IG unit.

FIG. 2 is a prior art partial cross sectional view of the FIG. 1 vacuum IG unit.

DETAILED DESCRIPTION OF CERTAIN EMBODIMENTS OF THIS INVENTION

Figure 3:
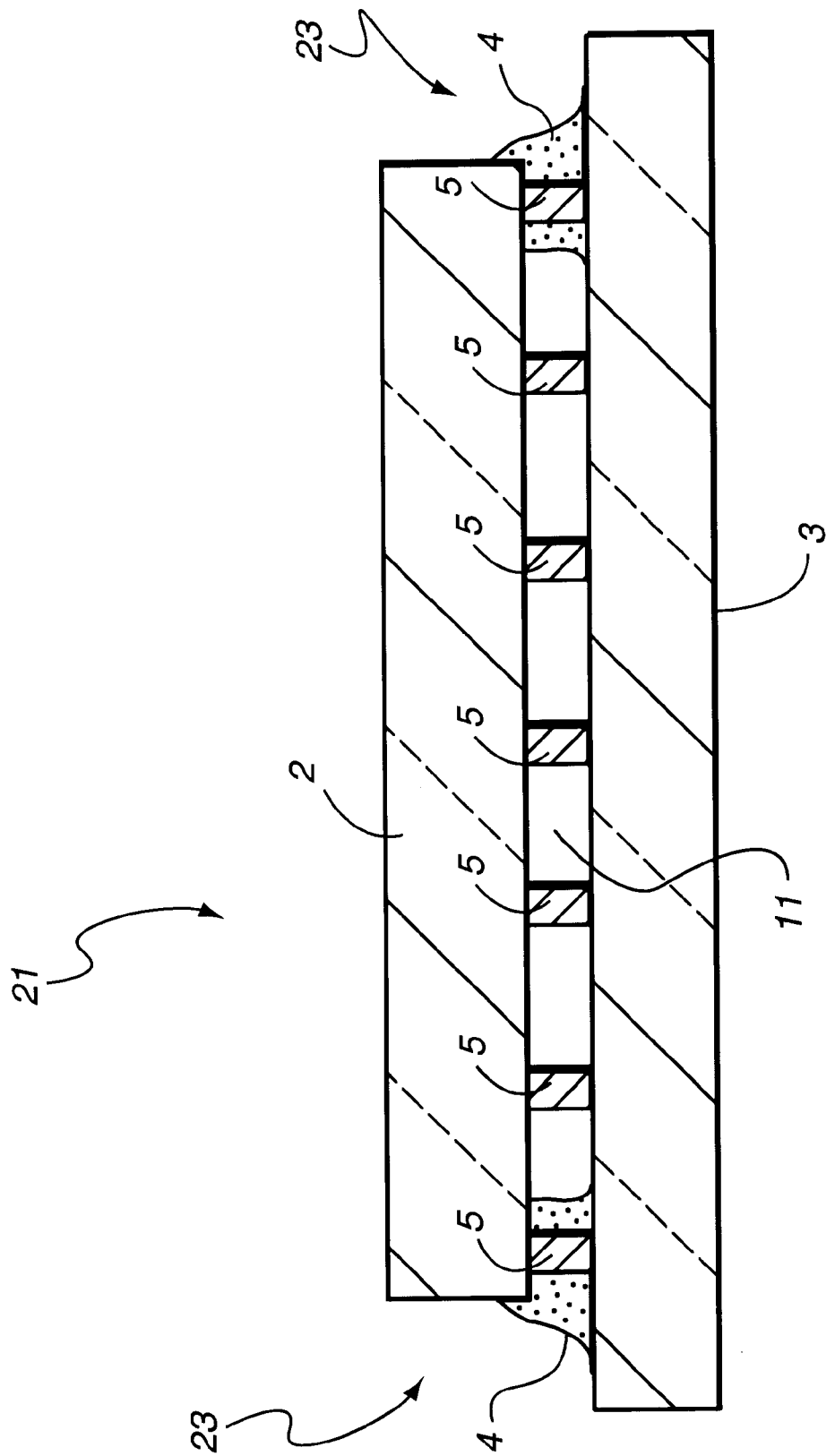
FIG. 3 is a side cross sectional view of a vacuum IG unit according to an embodiment of this invention.

Referring now more particularly to the accompanying drawings in which like reference numerals indicate like parts throughout the several views.

Certain embodiments of this invention relate to a peripheral or edge sealing system in a vacuum IG window is unit, and/or a method of making the same. The sealing system includes a peripheral seal with at least one spacer or pillar therein or in contact therewith. This enables the gap or space between the two glass substrates to be better controlled with regard to thickness, thereby reducing the likelihood of glass breakage or cracking due to high stress conditions. "Peripheral" and "edge" seals herein do not mean that the seals are located at the absolute periphery of the unit, but instead mean that the seal is at least partially located at or near (e.g. within about two inches) an edge of at least one substrate of the unit.

FIG. 3 is a cross sectional view of thermally insulating glass panel 21 according to an embodiment of this invention. Because interior space 11 between the opposing substrates is at a pressure lower or less than atmospheric in general, this type of panel is often referred to as a vacuum insulating glass (IG) unit.

Vacuum IG unit or panel 21 includes first glass substrate 2, second glass substrate 3, low pressure or evacuated space 11 between substrates 2 and 3, spacers/pillars 5 for spacing the substrates 2, 3 from one another and supporting them, an optional pump out tube (not shown) disposed in a hole or aperture formed in substrate 2 for evacuating space 11, and peripheral or edge sealing system 23 that hermetically seals low pressure space 11 between substrates 2, 3 and bonds the substrates to one another or holds them together. Sealing system 23 may include one or more different seals.

In certain embodiments, sealing system 23 includes sealing material 4 as well as at least one spacer/pillar 5 provided therein. Such spacers/pillars 5 of the sealing system may be dispersed throughout and at least partially surrounded by seal material 4. In certain embodiments, lateral sides of spacers 5 in sealing system 23 are entirely surrounded by and contacting seal material 4 so that they are embedded therein. The provision of spacers 5 within or immediately adjacent seal material 4 enables the gap between the substrates to be better controlled at edges of the unit, thereby reducing the likelihood of glass breakage or cracking due to high stress conditions. These seal embedded spacers support the substrates relative to one another proximate edges thereof.

Vacuum IG units 21 according to different embodiments of this invention may be used as residential or commercial windows. The evacuation of space 11 eliminates or reduces heat transport between glass substrates 2 and 3 due to gaseous conduction and convection. In addition, radiative heat transport between glass sheets 2 and 3 can be reduced to a low level by providing a low emittance (low-E) coating (s), not shown, on a surface of one or both of sheets 2, 3. High levels of thermal insulation can thus be achieved. Low gaseous thermal conduction may be achieved when the pressure in space 11 is reduced to a level equal to or below about $0.5 \times 10^{-3}$ Torr, more preferably below about 0.1 mTorr, or $10^{-4}$ Torr, and most preferably below about $10^{-6}$ Torr of atmospheric pressure. The hermetic sealing system 23 substantially eliminates any ingress or outgress of gas or air to/from space 11.

In certain embodiments of this invention, hermetic sealing material 4 may be made of or include any of the following materials: solder glass, indium, Ostalloy 313-4, 99% indium (In) wire available from Arconium (Providence, R.I.), liquid glass (i.e. glass composition with water in it when applied, wherein the water evaporates when heated to form the inner seal portion 45), rubber, silicone rubber, butyl rubber, Indalloy No. 53 available from Indium Corp. in paste form having a composition of 67% Bi and 33% In (% by weight), Indalloy No. 1 from Indium Corp. in paste form having a composition of 50% In and 50% Sn, Indalloy No. 290 available from Indium Corp. in paste form having a composition of 97% In and 3% Ag, Indalloy No. 9 from Indium Corp. in paste form having a composition of 70% Sn, 18% Pb and 12% In, Indalloy No. 281 available from Indium Corp. in paste form having a composition of 58% Bi and 42% Sn, Indalloy No. 206 available from Indium Corp. in paste form having a composition of 60% Pb and 40% In, Indalloy No. 227 available from Indium Corp. in paste form having a composition of 77.2% Sn, 20% In and 2.8% Ag, Indalloy No. 2 available from Indium Corp. in paste form having a composition of 80% In, 15% Pb and 5% Ag, Indalloy No. 3 available from Indium Corp. in paste form having a composition of 90% In and 10% Ag, or any other suitable flexible organic or inorganic material.

Still referring to FIG. 3, the array of spacers or pillars 5 is provided between substrates 2 and 3 in order to maintain separation of the two approximately parallel glass sheets against atmospheric pressure. It is often desirable for pillars 5 to be sufficiently small so that they are visibly unobtrusive. In certain embodiments, each pillar (those in contact with the sealing system and those not in contact with the sealing system) may have a height of from about 0.10 to 0.30 mm. Pillars may be made of or include solder glass, plastic, ceramic, glass, or metal. These spacers or pillars 5 may take the form of any number of geometric shapes. For example, spacers or pillars 5 may be spherical, cylindrical, square, rectangular, rod-like, bead-like, oval, trapezoidal, or the like.

In certain embodiments, all spacers/pillars 5 are of approximately the same size and/or material (i.e. those in seal material 4 are approximately the same size/material as those not contacting the seal material). However, in other embodiments of this invention, spacers/pillars 5 in seal material 4 may be of a smaller or larger size than those not in sealing material 4. In still further embodiments, there may be multiple different sizes of spacers 5 in seal material 4. In other embodiments, the density of spacers (i.e. the number of spacers per unit area) may be greater in the seal than proximate central areas of the unit.

An exemplary non-limiting method of making a vacuum IG window unit according to an embodiment of this invention is provided below. Initially, hermetic seal material is provided in slurry, powder or liquid form. A plurality of spacers/pillars 5 are dispensed into the seal material and the two are mixed together to form a sealing mixture. The sealing mixture inclusive of spacers 5 and material 4 is then dispensed or printed onto a major surface of glass substrate 3 proximate an edge or periphery thereof. An array of additional spacers/pillars 5 is then positioned within the boundary defined by the mixture on the same major surface of substrate 3 (i.e. in a more central area of the substrate). Second substrate 2 is then brought down on top of pillars 5 and the peripheral sealing mixture, the two substrates 2, 3 then being pressed together with the spacers in the central area of the unit and the sealing material proximate edges maintaining space between the two substrates. The entire unit is then heated, and permitted to go through a curing/cooling process (e.g. to about 480–520 degrees C for a period of eight (8) hours including ramp up and ramp down times). When seal material 4 cures, it may shrink to some degree. During such shrinking, spacers 5 in the sealing material 4 begin to support the substrate(s) 2, 3 proximate edges of the glass substrate[]s). Following curing, space 11 is defined between the two substrates 2, 3, with the space being maintained by spacers 5 in both sealing system 23 and proximate the center of the unit. Thereafter, a vacuum may be attached to the vacuum tube (e.g. see FIG. 2) in order to evacuate space 11 thereby creating a vacuum IG window unit.

Once given the above disclosure, many other features, modifications, and improvements will become apparent to the skilled artisan. Such other features, modifications, and improvements are, therefore, considered to be a part of this invention, the scope of which is to be determined by the following claims.

What is claimed is:

1. A thermally insulating glass panel comprising:

first and second spaced apart glass substrates defining a low pressure space therebetween having a pressure less than atmospheric pressure;

a first plurality of spacers disposed between said fist and second glass substrates for spacing said substrates from one another in order to maintain said low pressure space therebetween;

a hermetic peripheral seal including at least one sealing material; and a second plurality of spacers for spacing said substrates from one another, at least some of said spacers of said second plurality being in contact with and embedded within said sealing material.

2. The glass panel of claim 1, wherein said at least some of said spacers of said second plurality are of a different size than said spacers of said first plurality.

3. The panel of claim 1, wherein each of said at least some spacers of said second plurality is entirely surrounded by said sealing material, and wherein said spacers are of different material(s) than said sealing material.

4. The glass panel of claim 1, where said sealing material includes one of solder glass and indium.

5. The glass panel of claim 1, wherein said spacers of said first and second pluralities include at least one of a metal, a plastic, a ceramic, and a glass.

6. A method of making a thermally insulating glass panel comprising the steps of:

providing first and second substrates;

providing a plurality of spacers in a sealing material to form a flowable sealing mixture;

applying the flowable sealing mixture on at least a major surface of the first substrate proximate an edge thereof;

providing additional spacers proximate a central area of the first substrate;

moving the second substrate into a position such that at least some of the spacers proximate the central area of the first substrate and spacers embedded in the sealing mixture are disposed between the first and second substrates;

creating a seal using the sealing mixture so that a seal of the panel includes spacers therein; and evacuating a space between the first and second substrate so that the space has a pressure less than atmospheric pressure.

7. The method of claim 6, wherein the recited steps are performed in the order in which they are recited.

8. The method of claim 6, wherein said creating step includes heating the sealing mixture to a seal forming temperature and thereafter allowing the sealing mixture and spacers therein to cure to form the hermetic seal.

9. The method of claim 7, wherein the spacers in the sealing mixture are of a different size than certain spacers in the central area.

10. The method of claim 6, wherein said creating step includes creating a hermetic seal using the sealing mixture.

11. The method of claim 6, wherein the panel is a vacuum IG window unit.

12. The method of claim 6, further comprising flowing the sealing mixture including the spacers and sealing material onto the major surface of the substrate in a manner such that certain of the spacers are entirely surrounded by sealing material in the flowable sealing mixture.

* * * * *